United States Patent [19]
Tachika et al.

[11] Patent Number: 5,563,223
[45] Date of Patent: Oct. 8, 1996

[54] COATING RESIN COMPOSITIONS

[75] Inventors: Hiroshi Tachika; Kenji Ohama; Keiichiro Togawa; Masami Oka, all of Ohtsu, Japan

[73] Assignee: Toyo Boseki Kabushiki Kaisha, Shiga, Japan

[21] Appl. No.: 496,557

[22] Filed: Jun. 29, 1995

[30] Foreign Application Priority Data

Jul. 4, 1994 [JP] Japan .................................. 6-152245
Oct. 17, 1994 [JP] Japan .................................. 6-250496

[51] Int. Cl.$^6$ .................................................. C08F 20/00
[52] U.S. Cl. ..................... 525/437; 525/438; 525/440; 525/441; 528/196; 528/193; 528/194; 528/272; 524/601
[58] Field of Search ...................... 525/437, 438, 525/440, 441; 528/193, 194, 176, 272; 524/601

[56] References Cited

U.S. PATENT DOCUMENTS 4,140,729 2/1979 Tobias et al. ........................... 524/539

FOREIGN PATENT DOCUMENTS

| 2397484 | 11/1990 | European Pat. Off. . |
| 61-34754 | 8/1986 | Japan . |
| 62-5467 | 1/1987 | Japan . |
| 62-21830 | 5/1987 | Japan . |
| 3-217471 | 9/1991 | Japan . |

*Primary Examiner*—James J. Seidleck
*Assistant Examiner*—Terressa M. Mosley
*Attorney, Agent, or Firm*—Kenyon & Kenyon

[57] ABSTRACT

A coat resin composition comprising a polyester (A) comprising an acid component comprising an aromatic dicarboxylic acid in a proportion of 50–100% by mole relative to the entire acid component and other carboxylic acid(s) in a proportion of 50–0% by mole relative to the entire acid component, and a glycol component comprising 2-methyl-1,3-propanediol and/or 1,3-propanediol in a proportion of 1–25% by mole relative to the entire glycol component and an alkylene glycol having 5 to 10 carbon atoms in a proportion of 75–99% by mole relative to the entire glycol component, or an alicyclic glycol in a proportion of 20–85% by mole relative to the entire glycol component, an addition product of bisphenol A with alkylene oxide in a proportion of 80–15% by mole relative to the entire glycol component and other glycol(s) in a proportion of 0–50% by mole relative to the entire glycol component, wherein the total of the glycols is 100% by mole, the polyester (A) having a reduced viscosity of not less than 0.2 dl/g; and a curing agent (B) reactive with the polyester (A), in a proportion of (A)/(B)=99/1—50/50 (weight ratio). The present invention provides coating resin compositions capable of forming a coating film having superior processability, hardness, stain resistance, weatherability, resistance to staining by foodstuffs, or superior boiling water resistance, corrosion resistance, acid resistance and scratch property.

13 Claims, No Drawings

COATING RESIN COMPOSITIONS

FIELD OF THE INVENTION

The present invention relates to coating resin compositions capable of forming a coating film superior in processability, hardness and stain resistance.

More particularly, the present invention relates to coating resin compositions additionally capable of forming a coating film superior in weatherability and resistance to staining by foodstuffs.

The present invention further relates to coating resin compositions additionally capable of forming a coating film superior in boiling water resistance, corrosion resistance, acid resistance and scratch property, which are suitable as a primer for coating metals.

BACKGROUND OF THE INVENTION

There have been presently used a number of coating resin compositions for metal plates, such as alkyd resin, vinyl resin and silicone resin coatings which are used as solvent type coatings, aqueous dispersion coatings or powder coatings. However, these coatings do not necessarily satisfy the required properties, and a focus on one property leads to deficiency in another property, thereby posing restriction on the practical use.

Due to the insufficient performance of the conventional solvent type coatings, powder coatings are used for painting the roof and side surfaces of a refrigerator, which require high processability, hardness, alkali resistance, gasket resistance and stain resistance. The powder coatings show superior stain resistance. On the other hand, they are poor in processability and coating speed which is considerably low in comparison with solvent type coatings, so that production costs become high. addition, the powder coatings result in orange peel. The resins having superior processability have insufficient weatherability, and a post coating is applied to most of the outdoor home appliances.

For example, Japanese Patent Unexamined Publication Nos. 57746/1982 and 108081/1988 aim at achieving both the hardness and processability, but sufficient effects have not been attained. Japanese Patent Publication No. 21830/1987 is directed to coating resin compositions based mainly on terephthalic acid and alkylene glycol. While rather superior processability can be obtained, hardness is not sufficient and alkali resistance, weatherability and gasket resistance are also insufficient. Japanese Patent Publication No. 34754/1986 is also directed to coating resin compositions based mainly on terephthalic acid and alkylene glycol. They are insufficient in processability, alkali resistance and weatherability. Japanese Patent Unexamined Publication No. 2536/1978 and Japanese Patent Publication No. 56375/1990 propose introduction of a sulfonic acid metal salt for improving pigment dispersion property. Such introduction results in a coating film superior in gloss and vividness, but poor in weatherability, alkali resistance and resistance to staining by foodstuffs.

When a superior processability is desired for a polyester resin to be used for coating metal plates, the glass transition temperature generally needs to be set for not more than 40° C. At this glass transition temperature, however, the coating film becomes markedly soft, and high alkali resistance, gasket resistance, weatherability and resistance to staining by food cannot be achieved. On the other hand, superior hardness, alkali resistance, gasket resistance, weatherability and resistance to staining by food result in insufficient processability.

Epoxy resin coatings conventionally used as a primer for building materials such as roofing materials and wall materials, outdoor containers such as storerooms and radiator units, and refrigerator, all of which require hardness, superior boiling water resistance and corrosion resistance, beautiful coating film appearance and excellent scratch property, have superior adhesion, scratch property, boiling water resistance, corrosion resistance and solvent resistance, whereas they have extremely inferior processability. High molecular polyesters are used as a top coating and a primer coating for VTR, indoor containers and home appliances which require high processability. The high molecular polyester resin coating is superior in processability, hardness, boiling water resistance, corrosion resistance, acid resistance and Erichsen adhesion, but insufficient in scratch property.

For example, in Japanese Patent Unexamined Publication Nos. 167767/1981 and 217471/1991, superior processability, hardness, boiling water resistance, corrosion resistance, acid resistance and Erichsen adhesion were achieved. Yet, scratch property is poor in both publications to the extent that they are seldom used in the field where epoxy resins are used, such as for outdoor uses, thus leaving a demand for early resolution of the problems from the industrial circles.

SUMMARY OF THE INVENTION

Accordingly, it is an object of the present invention to provide coating resin compositions capable of forming a coating film superior in processability, hardness, gloss and vividness.

More particularly, the present invention provides coating resin compositions additionally capable of forming a coating film superior in weatherability, alkali resistance, gasket resistance and resistance to staining by foodstuffs.

The present invention further provides coating resin compositions additionally capable of forming a coating film superior in boiling water resistance, corrosion resistance, acid resistance and scratch property, which are suitable as a primer for coating metals.

DETAILED DESCRIPTION OF THE INVENTION

The present invention provides coating resin compositions, comprising a polyester (A) comprising an acid component comprising an aromatic dicarboxylic acid in a proportion of 50–100% by mole relative to the entire acid component and other carboxylic acid(s) in a proportion of 50–0% by mole relative to the entire acid component, and a glycol component comprising 2-methyl- 1,3-propanediol and/or 1,3-propanediol in a proportion of 1–25% by mole relative to the entire glycol component and an alkylene glycol having 5 to 10 carbon atoms in a proportion of 75–99% by mole relative to the entire glycol component, or an alicyclic glycol in a proportion of 20–85% by mole relative to the entire glycol component, an addition product of bisphenol A with alkylene oxide in a proportion of 80–15% by mole relative to the entire glycol component and other glycol(s) in a proportion of 0–50% by mole relative to the entire glycol component, wherein the total of the glycols is 100% by mole, the polyester (A) having a reduced viscosity of not less than 0.2 dl/g; and a curing agent (B) reactive with the polyester (A), in a proportion of (A)/(B)= 99/1—50/50 (weight ratio).

For a coating film having an appearance superior in gloss and vividness to exhibit excellent weatherability, resistance to staining by foodstuffs and gasket resistance, coating resin compositions (second invention) comprising a polyester (A) comprising an acid component comprising a terephthalic acid in a proportion of 30–80% by mole relative to the entire acid component, a terephthalic acid and other aromatic dicarboxylic acid(s) which total to 70–100% by mole relative to the entire acid component, and other carboxylic acid(s) in a proportion of 0–30% by mole relative to the entire acid component; and a glycol component comprising 2-methyl-1,3-propanediol and/or 1,3-propanediol in a proportion of 1–25% by mole relative to the entire glycol component and an alkylene glycol having 5 to 10 carbon atoms in a proportion of 75–99% by mole relative to the entire glycol component, the polyester (A) having a glass transition temperature of not more than 45° C. and a reduced viscosity of not less than 0.2 dl/g; and a curing agent (B) reactive with the polyester (A), in a proportion of (A)/(B)= 95/5—60/40 (weight ratio) is suitable. It is more preferable that the polyester (A) have a specific gravity of 1.21–1.30.

For exhibiting superior boiling water resistance, corrosion resistance, acid resistance and scratch property, coating resin compositions (third invention) comprising a polyester (A) comprising an acid component comprising an aromatic dicarboxylic acid in a proportion of 50–100% by mole relative to the entire acid component, other carboxylic acid(s) in a proportion of 0–50% by mole relative to the entire acid component, and a glycol component comprising an alicyclic glycol in a proportion of 20–85% by mole relative to the entire glycol component, an addition product of bisphenol A with alkylene oxide of the following formula (I) in a proportion of 80–15% by mole relative to the entire glycol component and other glycol(s) in a proportion of 0–50% by mole relative to the entire glycol component, the polyester (A) having a glass transition temperature of not less than 0° C. and a reduced viscosity of not less than 0.2 dl/g; and a curing agent (B) reactive with the polyester (A), in a proportion of (A)/(B)=99/1—50/50 (weight ratio) is suitable. Formula (I):

Formula (I):

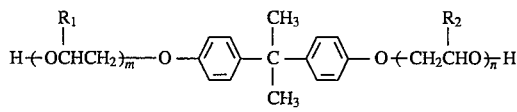

wherein $R_1$ and $R_2$ are the same or different and each is a hydrogen or a methyl, and m and n are respectively a number not less than 1 and satisfy $2 \leq m+n < 14$.

The polyester (A) of the present invention is obtained by copolymerizing an acid component and a glycol component. The copolymerization is carried out by a conventional method.

The acid component in the polyester (A) of the second invention of the present invention comprises terephthalic acid in a proportion of 30–80% by mole, preferably 30–60% by mole relative to the entire acid component and other carboxylic acid(s) in a proportion of 0–30% by mole relative to the entire acid component, and the total of the terephthalic acid and the other aromatic dicarboxylic acid(s) is 70–100% by mole, preferably 90–100% by mole relative to the entire acid component. When the terephthalic acid exceeds 80% by mole, good solubility in solvent is rather difficult to achieve, and when it is less than 30% by mole, good balance between processability and hardness tends to be unachievable. When the total of aromatic dicarboxylic acid is less than 70% by mole, high alkali resistance, resistance to staining by foodstuffs, weatherability and hardness tend to be unachievable.

Examples of the aromatic dicarboxylic acid to be used in the second invention of the present invention include terephthalic acid, isophthalic acid, orthophthalic acid and 2,6-naphthalenedicarboxylic acid. Of these, terephthalic acid and isophthalic acid in combination are particularly preferable for balancing processability and hardness.

Examples of other carboxylic acid(s) to be used in the second invention of the present invention include aliphatic dicarboxylic acids such as succinic acid, glutaric acid, adipic acid, sebacic acid, dodecanedicarboxylic acid and azelaic acid; and alicyclic dicarboxylic acids such as 1,2-cyclohexanedicarboxylic acid, 1,3-cyclohexanedicarboxylic acid and 1,4-cyclohexanedicarboxylic acid. A polycarboxylic acid such as trimellitic anhydride and pyromellitic anhydride may be added to the extent that the present invention is not adversely affected.

The glycol component in the polyester (A) of the second invention of the present invention comprises 2-methyl-1,3-propanediol and/or 1,3-propanediol in a proportion of 1–25% by mole, preferably 10–25% by mole relative to the entire glycol component, and alkylene glycol having 5 to 10 carbon atoms in a proportion of 75–99% by mole, preferably 75–90% by mole relative to the entire glycol component. When the 2-methyl-1,3-propanediol and/or 1,3-propanediol exceeds 25% by mole, good processability is hard to attain and alkali resistance tends to fall. When it is contained in an amount of less than 1% by mole, superior hardness tends to be unattainable. Moreover, a glycol other than 2-methyl-1, 3-propanediol and 1,3-propanediol as a hard component having not more than 3 carbon atoms for the main chain often leads to poor results. For example, ethylene glycol tends to prevent high alkali resistance and weatherability and neopentyl glycol tends to prevent superior stain resistance and a balance between superior hardness and processability. An alkylene glycol having 5 to 10 carbon atoms in a proportion of less than 75% by mole tends to result in poor processability.

Examples of the alkylene glycol having 5 to 10 carbon atoms to be used in the second invention of the present invention include 1,5-pentanediol, 1,6-hexanediol, 3-methyl-1,5-pentanediol, 2-methyl-1,5-pentanediol, 1,9-nonanediol, 1,10-decanediol, 1,4-cyclohexanedimethanol, 1,3-cyclohexanedimethanol and 1,2-cyclohexanedimethanol, with preference given to 1,6-hexanediol and 1,5-pentanediol in terms of physical properties of the coating film. A polyol such as trimethylolethane, trimethylolpropane, glycerin and pentaerythritol may be added as long as it does not impair the present invention.

A dicarboxylic acid having a sulfonic acid metal salt such as a metal salt of 5-sulfoisophthalic acid, 4-sulfonaphthalene-2,7-dicarboxylic acid or 5-[4-sulfophenoxy]isophthalic acid, or a glycol having a sulfonic acid metal salt such as a metal salt of 2-sulfo-1,4-butanediol or 2,5-dimethyl-3-sulfo-2,5-hexanediol may be used in a proportion of not more than 5% by mole relative to the entire acid or entire glycol component.

When preparing the polyester (A) of the second invention of the present invention, trimellitic anhydride, phthalic anhydride, pyromellitic anhydride, succinic anhydride, 1,8-naphthalic anhydride, 1,2-cyclohexanedicarboxylic anhydride and the like may be added to increase the acid value, after polymerization of the polyester. A higher acid value increases resistance to staining by foodstuffs. Preferable acid value is 20–300 equivalents/$10^6$ g, more preferably 50–150 equivalents/$10^6$ g. When the acid value exceeds 300 equivalents/$10^6$ g, superior processability may not be achieved.

The polyester (A) of the second invention of the present invention preferably has a specific gravity of 1.21–1.30. When the specific gravity is less than 1.21, the hardness and processability are hard to be well balanced and stain resistance also tends to fall. When the specific gravity exceeds 1.30, good solubility in solvent becomes hard to achieve.

The polyester (A) of the second invention of the present invention has a glass transition temperature of not more than 45° C., preferably 10°–30° C. When the glass transition temperature exceeds 45° C., the polyester tends to harden and good processability cannot be obtained.

The reduced viscosity of the polyester (A) of the second invention of the present invention is not less than 0.2 dl/g, preferably not less than 0.4 dl/g. When the reduced viscosity is less than 0.2 dl/g, good processability tends to be unachievable.

The acid component in the polyester (A) of the third invention of the present invention comprises aromatic dicarboxylic acid in a proportion of 50–100% by mole, preferably 60–100% by mole and more preferably 70–100% by mole relative to the entire acid component. When the aromatic dicarboxylic acid is less than 50% by mole, superior scratch property is hard to attain and hardness, boiling water resistance, corrosion resistance and acid resistance tend to fall.

Examples of the aromatic carboxylic acid to be used in the third invention of the present invention include terephthalic acid, isophthalic acid, orthophthalic acid and 2,6-naphthalenedicarboxylic acid.

Examples of other carboxylic acid(s) to be used in the third invention of the present invention include alicyclic dicarboxylic acids such as 1,4-cyclohexanedicarboxylic acid, 1,3-cyclohexanedicarboxylic acid, 1,2-cyclohexanedicarboxylic acid, 4-methylhexahydrophthalic anhydride, 3-methylhexahydrophthalic anhydride, 2-methylhexahydrophthalic anhydride, hydrogenated dicarboxybisphenol A, hydrogenated dimer acid, hydrogenated naphthalenedicarboxylic acid and tricyclodecanedicarboxylic acid; and aliphatic dicarboxylic acids such as succinic acid, glutaric acid, adipic acid, sebacic acid, dodecanedicarboxylic acid and azelaic acid, with preference given to alicyclic dicarboxylic acid. A polycarboxylic acid such as trimellitic anhydride and pyromellitic anhydride may be added to the extent that no adverse influence is exerted.

In the polyester (A) of the third invention of the present invention, the glycol component comprises alicyclic glycol in a proportion of 20–85% by mole, preferably 30–80% by mole and more preferably 40–75% by mole relative to the entire glycol component. When the alicyclic glycol is less than 20% by mole, processability and scratch property tend to become poor. When the alicyclic glycol exceeds 85% by mole, boiling water resistance and corrosion resistance tend to fall.

Examples of the alicyclic glycol to be used in the third invention of the present invention include 1,4-cyclohexanedimethanol, 1,3-cyclohexanedimethanol, 1,2-cyclohexanedimethanol and hydrogenated bisphenol.

In the polyester (A) of the third invention of the present invention, the glycol component comprises an addition product of bisphenol A with alkylene oxide of the aforementioned formula (I) in a proportion of 80–15% by mole, preferably 70–20% by mole, and more preferably 60–25% by mole relative to the entire glycol component. When the addition product of bisphenol A with alkylene oxide exceeds 80% by mole, processability tends to become poor. When it is contained in a proportion of less than 15% by mole, scratch property, corrosion resistance and boiling water resistance tend to fall. The number of m+n of the addition product of bisphenol A with alkylene oxide of the aforementioned formula (I) is not less than 2 and less than 14, preferably 2–8, and more preferably 2–4. When it is not less than 14, hardness, corrosion resistance, boiling water resistance and scratch property tend to fall. When m+n is less than 2, the reactivity during polymerization tends to become insufficient.

In the polyester (A) of the third invention of the present invention, the glycol component comprises other glycol(s) in a proportion of 0–50% by mole, preferably 0–40% by mole, and more preferably 0–30% by mole relative to the entire glycol component. When it exceeds 50% by mole, chemical resistance, corrosion resistance and boiling water resistance tend to fall.

Examples of the other glycol(s) to be used in the third invention of the present invention include alkylene glycols having 2 to 10 carbon atoms, such as ethylene glycol, propylene glycol, diethylene glycol, triethylene glycol, tetraethylene glycol, polyethylene glycol, polytetramethylene glycol, 1,3-propanediol, 1,4-butanediol, 1,5-pentanediol, neopentyl glycol, 1,6-hexanediol, 3-methyl-1,5-pentanediol, 2-methyl-1,5-pentanediol, 2,2-diethyl-1,3-propanediol, 2-butyl-2-ethyl-1,3-propanediol, 1,9-nonanediol and 1,10-decanediol. A polyol such as trimethylolethane, trimethylolpropane, glycerin, pentaerythritol and polyglycerin may be concurrently used.

A sulfonic acid metal salt such as a metal salt of 5-sulfoisophthalic acid, 4-sulfonaphthalene-2,7-dicarboxylic acid or 5-[4-sulfophenoxy]isophthalic acid, or a glycol having a sulfonic acid metal salt such as a metal salt of 2-sulfo-1,4-butanediol or 2,5-dimethyl-3-sulfo-2,5-hexanediol may be used in a proportion of not more than 5% by mole relative to the entire acid or entire glycol component.

When preparing the polyester (A) of the third invention of the present invention, trimellytic anhydride, phthalic anhydride, pyromellitic anhydride, succinic anhydride, 1,8-naphthalic anhydride, 1,2-cyclohexanedicarboxylic anhydride or 3,3,4,4-benzophenonetetracarboxylic anhydride may be added to increase the acid value, after polymerizing the polyester. Increase of the acid value leads to improved scratch property. Preferably, the acid value is 50–500 equivalents/$10^6$ g, preferably 50–300 equivalents/$10^6$ g.

The polyester of the third invention of the present invention hat a glass transition temperature of not less than 0° C., preferably not less than 20° C., and more preferably not less than 40° C. When the glass transition temperature is less than 0° C., desired hardness, scratch property, boiling water resistance and corrosion resistance tend to be unachievable.

The polyester of the third invention of the present invention has a reduced viscosity of not less than 0.2 dl/g, preferably not less than 0.25 dl/g, and more preferably not less than 0.30 dl/g. A reduced viscosity of less than 0.2 dl/g does not result in good processability.

With regard to the polyester of the present invention, the reduced viscosity can be adjusted to the above-mentioned range by changing polymerization conditions of the polyester, and the glass transition temperature and specific gravity can be adjusted to the above-mentioned range by selecting the acid component and the glycol component as appropriate.

The coating resin compositions of the present invention are obtained by mixing a polyester (A) and a curing agent (B) reactive with the polyester (A), in a proportion of (A)/(B)=99/1—50/50, more preferably in a proportion of (A)/(B)=95/5—60/40 (weight ratio). When (A) is contained in a proportion of more than 99/1, scratch property and corrosion resistance become poor and when it is contained in a proportion of more than 95/5, hardness of the coating film and stain resistance tend to be degraded. When (A) is contained in a proportion of less than 60/40, processability tends to fall, and when it is contained in a proportion of less than 50/50, processability becomes poor.

Examples of the curing agent (B) reactive with the polyester (A) include alkyl etherified aminoformaldehyde resin, epoxy compound and isocyanate compound.

The alkyl etherified aminoformaldehyde is a condensed product of formaldehyde, paraformaldehyde and the like, which is alkyl etherified with an alcohol having 1 to 4 carbon atoms such as methanol, ethanol, n-propanol, isopropanol and n-butanol, and urea, N,N-ethyleneurea, dicyandiamide, amino-triazine and the like. Examples thereof include methoxylated methylol-N,N-ethyleneurea, methoxylated methyloldicyandiamide, methoxylated methylolbenzoguanamine, butoxylated methylolbenzoguanamine, methoxylated methylolmelamine, butoxylated methylolmelamine, methoxylated/butoxylated methylolmelamine, with preference given, from the aspect of processability, to methoxylated methylolmelamine, butoxylated methylolmelamine and methoxylated/butoxylated methylolmelamine which may be used alone or in combination.

Examples of the epoxy compound include diglycidyl ethers of bisphenol A and oligomer thereof, diglycidyl ethers of hydrogenated bisphenol A and oligomer thereof, diglycidyl orthophthalate, diglycidyl isophthalate, diglycidyl terephthalate, diglycidyl p-hydroxybenzoate, diglycidyl tetrahydrophthalate, diglycidyl hexahydrophthalate, diglycidyl succinate, diglycidyl adipate, diglycidyl sebacate, ethylene glycol diglycidyl ether, propylene glycol diglycidyl ether, 1,4-butanediol diglycidyl ether, 1,6-hexanediol diglycidyl ether and polyalkylene glycol diglycidyl ether, diglycidyl trimellitate, triglycidyl isocyanurate, 1,4-diglycidyloxybenzene, diglycidylpropyleneurea, glycerol triglycidyl ether, trimethylolethane triglycidyl ether, trimethylolpropane triglycidyl ether, pentaerythritol tetraglycidyl ether and triglycidyl ether of glycerolalkylene oxide adduct.

Examples of the isocyanate compound include aromatic and aliphatic diisocyanates and polyisocyanate (trivalent or more), which may be a low molecular compound or a high molecular compound. For example, tetramethylenediisocyante, hexamethylenediisocynate, toluenediisocyanate, diphenylmethanediisocyanate, hydrogenated diphenylmethanediisocyanate, xylylenediisocyanate, hydrogenated xylylenediisocyanate, isophoronediisocyanate and trimers of these isocyanate compounds, and a compound having isocyanate at the terminal, obtained by reacting an excess of the above-mentioned isocyanate compound with a low molecular compound having active hydrogen such as ethylene glycol, propylene glycol, trimethylolpropane, glycerin, sorbitol, ethylenediamine, monoethanolamine, diethanolamine and triethanolamine or a high molecular compound having active hydrogen such as various polyester polyols, polyether polyols and polyamides may be used.

The isocyanate compound may be a blocked isocyanate. Examples of the isocyanate blocking agent include phenols such as phenol, thiophenol, methylthiophenol, ethylthiophenol, cresol, xylenol, resorcinol, nitrophenol and chlorophenol, oximes such as acetoxime, methyl ethyl ketoxime and cyclohexanone oxime, alcohols such as methanol, ethanol, propanol and butanol, halogen-substituted alcohols such as ethylene chlorohydrin and 1,3-dichloro-2-propanol, tertiary alcohols such as t-butanol and t-pentanol, and lactams such as ε-caprolactam, δ-valerolactam, γ-butyrolactam and β-propyrolactam. Besides these, aromatic amines, imides, compounds having active methylene such as acetylacetone, acetoacetic ester and ethyl malonate, mercaptanes, imines, ureas and sodium bisulfite of diaryls may be exemplified. The blocked isocyanate is obtained by addition reation of the above-mentioned isocyanate compound and an isocyanate blocking agent by an appropriate method conventionally known.

A known curing agent or a promoter selected according to the kind of the curing agent used may be also added.

While the coating resin compositions (hereinafter referred to as a coating composition) of the present invention shows sufficient properties only by coating and baking on a steel plate, an epoxy resin, urethane resin, amide resin or imide resin may be added in case where improved boiling water resistance and improved adhesion are required. When an improved weatherability is required, a polyester resin other than those to be used in the present invention, alkyd resin, acrylic resin, silicon resin or fluorocarbon resin may be used as a top coating agent.

The baking temperature of the coating composition of the present invention is optionally determined according to the size and thickness of metal plates, capacity of the baking furnace and curing property of the coating. The coating composition is prepared using a mixer, a roll kneader, ball mill, blender and the like. For coating, roller painting, roll coater painting, spray coating and electrostatic coating may be used as appropriate.

According to the object and use, the coating composition of the present invention may contain an additive such as pigment (e.g. titanium oxide, silica, barium sulfate, talc and various colorings), corrosion preventive pigment (e.g. zinc chromate, strontium chromate, calcium chromate and red iron oxide), glass fiber and wax, where necessary.

The present invention is described by referring to the following examples, wherein "parts" means "parts by weight". The respective determinations followed the methods described below.

Note that the determinations 1 to 4 were performed for the polyester obtained in the present invention and those of 5–14 were performed using coated steel plates obtained by applying coating compositions on steel plates, as shown in Example 1 or 7 to be described later.

1. Reduced Viscosity ηsp/c (dl/g)

A polyester (solid content 0.10 g) was dissolved in a mixed solvent (25 cc) of phenol/tetrachloroethane (weight ratio 6/4) and subjected to the determination at 30° C.

2. Glass Transition Temperature

Using a differential scanning calorimeter (DSC), determination was performed at a temperature elevating rate of 20° C./min. The sample (5 mg, solid content) was placed in an aluminum presser lid container and used after folding back the edge.

3. Acid Value

A sample (solid content 0.2 g) was precisely weighed and dissolved in 20 ml of chloroform. 0.01N Potassium hydroxide (in ethanol) was titrated for determination. As an indicator, phenolphthalein was used.

4. Specific Gravity

A 500 ml measuring cylinder charged with an about 20% aqueous solution of calcium chloride was adjusted to 30°±0.05° C. A specimen (polyester) without oil and foams was added and the specific gravity of the calcium chloride was adjusted to make the specimen reside at the middle of the measuring cylinder. The specific gravity of the calcium chloride at this time was measured by a specific gravity meter, and taken as the specific gravity of the sample.

5. Stain Resistance 5-i Resistance to Mustard (resistance to staining by foodstuffs)

Mustard was applied on a coating surface of a steel plate and the plate was left standing at 25° C. for 24 hours. Then, the plate was washed with water and evaluated according to the degree of coloring. (○: scarce coloring △: slight coloring X: remarkable coloring)

5-ii Gasket Resistance

The door packing of a refrigerator was adhered to the coating surface of a steel plate by a magnet and left standing at 70° C. for 96 hours. Then, the packing was wiped with waste and the trace was evaluated into five classes. (5: no trace 4: slight trace 3: trace observed 2: clear trace 1: completely clear trace)

5-iii Resistance to Staining by Magic Marker

A line was drawn on a coating surface of a steel plate with a red magic marker and the plate was left standing for 2 hours. The line was wiped away with ethanol and the trace of the marker was evaluated into five classes. (5: no trace 4: slight trace 3: trace observed 2: clear trace 1: completely clear trace)

6. Hardness

Using a high-quality pencil as defined in JIS S-6006 against the coating surface of a steel plate, the hardness was determined according to JIS K-5400 based on the presence of scratches.

7. Processability

A coated steel plate was bent 180 degrees and the cracks developed at the bending site were observed using a 10-magnitude magnifier. In the evaluation, 3T means the absence of cracks when three plates having the same thickness were layered and inserted at the bending site. 0T means the absence of cracks when bent 180 degrees without a plate.

8. Gloss

The 60 degrees reflection of the coating surface of a steel plate was measured.

9. Alkali Resistance

A coated steel plate was soaked in 10% aqueous NaOH for 72 hours and the retention of the gloss on the coating surface was determined. For the determination, a polyester primer was used and evaluation was performed under the conditions at which blisters do not occur.

10. Weatherability

Using a promoted weatherability tester QUV, the weatherability was evaluated by the retention of the gloss on the coating surface of a steel plate after 2,000 hours of irradiation. QUV irradiation conditions of UV 60° C.×4 hours, dewing 50° C.×4 hours (total 8 hours) was a single cycle, and the cycle was repeated 250 times.

11. Acid Resistance

A coated steel plate was soaked in a 5% aqueous sulfuric acid solution at room temperature for 50 hours, and abnormality in the coating appearance was visually examined. (○: fine X: failure)

12. Boiling Water Resistance

A coated steel plate was soaked in boiling water for 10 hours, and abnormality in the coating appearance was visually examined. (○: fine X: failure)

13. Corrosion Resistance

Cross cuts were made on the coating surface with a knife and a 5% aqueous NaCl solution was sprayed at 35° C. The corrosion of the coating surface was examined 1,000 hours later. (Smaller corrosion width (unit: mm) from the cross cut means better result)

14. Scratch Property

A pencil of hardness 7H was attached to a pencil hardness tester and applied with a load of 2 kg. According to JIS K-5400, the coating film was damaged and the peeling of the coating film was visually observed. (⊚: superior ○: fine X: failure)

Synthesis 1

Terephthalic acid (389 parts), isophthalic acid (389 parts), 3-methyl-1,3-propanediol (238 parts), 1,5-pentanediol (642 parts) and tetrabutyl titanate (0.41 part) were charged in a reaction vessel equipped with a stirrer, a condenser and a thermometer, and esterification reaction was carried out from 160° C. to 240° C. over 4 hours. The system was gradually depressurized to 5 mmHg over 50 minutes. A condensation polymerization was carried out at 260° C. in a vacuo under 0.3 mmHg or below for 60 minutes. The obtained copolymerization polyester A had a composition, by NMR analysis etc., of an acid component comprising terephthalic acid/isophthalic acid at a molar ratio of 50/50 and a glycol component comprising 3-methyl-1,3-propanediol/1,5-pentanediol at a molar ratio of 21/79. The reduced viscosity was determined and found to be 0.45 dl/g, the glass transition temperature to be 10° C. and the specific gravity to be 1.23. The results are shown in Table 1.

The polyesters B to L having the compositions shown in Tables 1 to 3 were synthesized according to the above-mentioned Synthesis 1. F to L are polyesters for comparison.

EXAMPLE 1

Titanium dioxide (125 parts), methylated melamine (15.7 parts, trademark SUMIMAL M40S, involatile content 80%, manufactured by Sumitomo Chemical Company, Limited), butylated melamine (20.8 parts, trademark SUPER BECKAMINE J-820, involatile content 60%, manufactured by Dainippon Ink and Chemicals, Inc.), a 10% benzyl alcohol solution (2.5 parts) of p-toluenesulfonic acid and a viscosity adjusting agent POLYFLOW-S (0.5 part, manufactured by Kyoeisha Chemical Co., Ltd.) were added to a solution of polyester A (100 parts, solid content), and the mixture was dispersed for 5 hours in a glass beads type high speed shaker to give a coating composition.

The coating composition was applied to a 0.5 mm thick zinc-plated steel plate in a coating film thickness of 20 μm, and the plate was baked at 230° C. for 1 minute. The obtained coating film had superior processability and hardness, and was superior in alkali resistance, gasket resistance, weatherability and stain resistance. The plate retained 90% or more of the gloss even after outdoor exposure for 2 years. The results are shown in Table 4.

The coating compositions of Examples 2–6 and Comparative Examples 1–7 were prepared in the same manner as in Example 1, following the compositions shown in Tables 4 to 6, and subjected to coating and baking. The test results of the obtained coated steel plates are shown in Tables 4 to 6. The composition ratios of the coatings have been converted to solid contents.

TABLE 1

| composition (% by mole) | | polyester A | polyester B | polyester C | polyester D |
|---|---|---|---|---|---|
| acid component | terephthalic acid | 50 | 50 | 50 | 50 |
| | isophthalic acid | 50 | 50 | 49 | 49 |
| | orthophthalic acid | | | | |
| | adipic acid | | | | |
| | trimellitic acid (added later) | | | 1 | 1 |
| diol component | 2-methyl-1,3-propanediol | 21 | 23 | 20 | |
| | 1,3-propanediol | | | | |
| | ethylene glycol | | | | 24 |
| | neopentyl glycol | | | | |

TABLE 1-continued

| composition (% by mole) | polyester A | B | C | D |
|---|---|---|---|---|
| trimethylol propane | | | | |
| 1,5-pentanediol | 79 | | 80 | 76 |
| 1,6-hexanediol | | 77 | | |
| reduced viscosity (dl/g) | 0.45 | 0.50 | 0.50 | 0.48 |
| glass transition temperature (°C.) | 10 | 10 | 10 | 5 |
| specific gravity | 1.23 | 1.23 | 1.23 | 1.25 |
| acid value (equivalent/$10^6$ g) | 5 | 8 | 82 | 80 |

TABLE 2

| composition (% by mole) | polyester for comparison F | G | H |
|---|---|---|---|
| acid component | | | | |
| terephthalic acid | 50 | 50 | 50 |
| isophthalic acid | 50 | 50 | 50 |
| orthophthalic acid | | | |
| adipic acid | | | |
| trimellitic acid (added later) | | | |
| diol component | | | |
| 2-methyl-1,3-propanediol | 75 | | |
| 1,3-propanediol | | 23 | |
| ethylene glycol | | | 50 |
| neopentyl glycol | | | |
| trimethylol propane | | | 5 |
| 1,5-pentanediol | 25 | 77 | |
| 1,6-hexanediol | | | 45 |
| reduced viscosity (dl/g) | 0.50 | 0.15 | 0.18 |
| glass transition temperature (°C.) | 35 | 5 | 8 |
| specific gravity | 1.25 | 1.24 | 1.25 |
| acid value (equivalent/$10^6$ g) | 10 | 18 | 15 |

TABLE 3

| composition (% by mole) | polyester for comparison I | J | K | L |
|---|---|---|---|---|
| acid component | | | | |
| terephthalic acid | 50 | 60 | 45 | 50 |
| isophthalic acid | 50 | 40 | 55 | 50 |
| orthophthalic acid | | | | |
| adipic acid | | | | |
| trimellitic acid (added later) | | | | |
| diol component | | | | |
| 2-methyl-1,3-propanediol | | | | |
| 1,3-propanediol | | | 50 | |
| ethylene glycol | 49 | 40 | | |
| neopentyl glycol | | | | 22 |
| trimethylol propane | | | | |
| 1,5-pentanediol | | 60 | 50 | |
| 1,6-hexanediol | 51 | | | 78 |
| reduced viscosity (dl/g) | 0.42 | 0.48 | 0.51 | 0.44 |
| glass transition temperature (°C.) | 15 | 15 | 28 | 15 |
| specific gravity | 1.26 | 1.25 | 1.25 | 1.20 |
| acid value (equivalent/$10^6$ g) | 5 | 10 | 7 | 10 |

TABLE 4

| | Example 1 | 2 | 3 | 4 | 5 | 6 |
|---|---|---|---|---|---|---|
| Ingredients | | | | | | |
| polyester | A | A | B | C | D | D |
| | 100 | 100 | 100 | 100 | 100 | 100 |
| aminoformaldehyde 1) | 12.5 | | 12.5 | 12.5 | 12.5 | 25 |
| aminoformaldehyde 2) | 12.5 | | 12.5 | 12.5 | 12.5 | |
| blocked isocyanate 3) | | 25 | | | | |
| p-toluenesulfonic acid | 0.25 | | 0.25 | 0.25 | 0.25 | 0.25 |
| dibutyl tin dilaurate | | 0.50 | | | | |
| titanium dioxide | 125 | 125 | 125 | 125 | 125 | 125 |
| POLYFLOW-S | 0.5 | 0.5 | 0.5 | 0.5 | 0.5 | 0.5 |
| Coating film properties | | | | | | |
| gloss (%) | 90 | 91 | 91 | 92 | 90 | 92 |
| processability (T) | 0 | 0 | 0 | 0 | 0 | 0 |
| hardness | H | F | H | H | H | H |
| mustard stain resistance (ΔE) | Δ | Δ | Δ | o | o | o |
| gasket resistance | 5 | 5 | 5 | 5 | 5 | 5 |
| magic marker stain resistance | 4 | 3 | 4 | 4 | 4 | 3 |
| alkali resistance (%) | 95 | 98 | 93 | 92 | 95 | 95 |
| weatherability (%) | 95 | 93 | 95 | 95 | 94 | 92 |

1) methylated melamine, SUMIMAL M40S (manufactured by Sumitomo Chemical Company, Limited)
2) butylated melamine, SUPER BECKAMINE J-820 (manufactured by Dainippon Ink and Chemicals, Inc.)
3) IPDI B1530 (manufactured by Daicel-Hüls Ltd.)

TABLE 5

| | Comparative Example 1 | 2 | 3 | 4 |
|---|---|---|---|---|
| Ingredients | | | | |
| polyester | F | G | H | I |
| | 100 | 100 | 100 | 100 |
| aminoformaldehyde 1) | 12.5 | 12.5 | 12.5 | 12.5 |
| aminoformaldehyde 2) | 12.5 | 12.5 | 12.5 | 12.5 |
| blocked isocyanate 3) | | | | |
| p-toluenesulfonic acid | 0.25 | 0.25 | 0.25 | 0.25 |
| dibutyl tin dilaurate | | | | |
| titanium dioxide | 125 | 125 | 125 | 125 |
| POLYFLOW-S | 0.5 | 0.5 | 0.5 | 0.5 |
| Coating film properties | | | | |
| gloss (%) | 90 | 93 | 91 | 90 |
| processability (T) | 3 | 5 | 5 | 2 |
| hardness | H | HB | HB | H |
| mustard stain resistance (ΔE) | Δ | X | Δ | Δ |
| gasket resistance | 5 | 3 | 5 | 5 |
| magic marker stain resistance | 4 | 3 | 4 | 4 |
| alkali resistance (%) | 52 | 70 | 25 | 20 |
| weatherability (%) | 60 | 62 | 21 | 15 |

1) methylated melamine, SUMIMAL M40S (manufactured by Sumitomo Chemical Company, Limited)
2) butylated melamine SUPER BECKAMINE J-820 (manufactured by Dainippon Ink and Chemicals, Inc.)
3) IPDI B1530 (manufactured by Daicel-Hüls Ltd.)

TABLE 6

| | Comparative Example | | |
|---|---|---|---|
| | 5 | 6 | 7 |
| Ingredients | | | |
| polyester | J | K | L |
| | 100 | 100 | 100 |
| aminoformaldehyde 1) | 12.5 | 12.5 | 12.5 |
| aminoformaldehyde 2) | 12.5 | 12.5 | 12.5 |
| blocked isocyanate 3) | | | |
| p-toluenesulfonic acid | 0.25 | 0.25 | 0.25 |
| dibutyl tin dilaurate | | | |
| titanium dioxide | 125 | 125 | 125 |
| POLYFLOW-S | 0.5 | 0.5 | 0.5 |
| Coating film properties | | | |
| gloss (%) | 90 | 90 | 93 |
| processability (T) | 2 | 3 | 0 |
| hardness | H | H | HB |
| mustard stain resistance ($\Delta E$) | $\Delta$ | $\Delta$ | X |
| gasket resistance | 5 | 5 | 3 |
| magic marker stain resistance | 4 | 4 | 2 |
| alkali resistance (%) | 23 | 55 | 90 |
| weatherability (%) | 18 | 43 | 94 |

1) methylated melamine, SUMIMAL M40S (manufactured by Sumitomo Chemical Company, Limited)
2) butylated melamine, SUPER BECKAMINE J-820 (manufactured by Dainippon Ink and Chemicals, Inc.)
3) IPDI B1530 (manufactured by Daicel-Hüls Ltd.)

The coating composition of the second invention of the present invention has established high hardness, processability and stain resistance, and surprisingly afforded excellent alkali resistance, gasket resistance, weatherability and resistance to staining by foodstuffs, which have not been achieved by the prior art. Accordingly, the present invention meets the high quality requirements in the field of home appliances including those for outdoor uses. The polyester to be used in the present invention can be used not only as a coating composition, but also as an adhesive for various base materials such as plastic films of polyethylene terephthalate, and metal plates of iron or tin, or as a binder for various pigments, solely or in combination with known curing agents.

The third invention is described by way of the following Examples.

SYNTHESIS 2

Dimethylterephthalic acid (200 parts), dimethylisophthalic acid (200 parts), 1,4-cyclohexanedimethanol (134 parts), an addition product of bisphenol A with 2.3 moles of ethylene oxide (331 parts), ethylene glycol (144 parts) and tetrabutyl titanate (0.255 part) were charged in a reaction vessel equipped with a stirrer, a condenser and a thermometer, and esterification reaction was carried out from 160° C. to 250° C. over 4 hours. The system was gradually depresurized to 5 mmHg over 50 minutes. A condensation polymerization was carried out at 260° C. in a vacuo under 0.3 mmHg or below for 60 minutes. The obtained copolymerization polyester A' had a composition, by NMR analysis etc., of an acid component comprising a terephthalic acid/isophthalic acid at a molar ratio of 50/50 and a glycol component comprising 1,4-cyclohexanedimethanol/addition product of bisphenol A with 2.3 moles of ethylene oxide/ethylene glycol at a molar ratio of 45/50/5. The reduced viscosity was determined and found to be 0.35 dl/g, the acid value to be 12 equivalents/$10^6$ g and the glass transition temperature to be 69° C. The results are shown in Table 7.

The polyesters B' to M' having the compositions shown in Tables 7 to 10 were synthesized according to the abovementioned Synthesis 2. The polyesters G' to M' are for comparison.

Preparative Example
Preparation of Top Coating

A commercially available high molecular polyester VYLON 300 (80 parts, trademark, manufactured by Toyobo Co., Ltd.) and VYLON 200 (20 parts, trademark, manufactured by Toyobo Co., Ltd.) were added to a mixed solvent of cyclohexanone (117 parts) and Solvesso 150 (116 parts, aromatic hydrocarbon) under stirring at 80° C., and dissolved over about 3 hours. Titanium dioxide (125 parts), methyl etherified methylolmelamine (25 parts, Trademark SUMIMAL M-40S, involatile content 80%, manufactured by Sumitomo Chemical Company, Limited) and a 10% benzyl alcohol solution (2.5 parts) of p-toluenesulfonic acid was added per 100 parts of the solid content in the obtained solution. The mixture was dispersed for 5 hours in a glass beads type high speed shaker to give a top coating (a) for steel plates.

EXAMPLE 7

Polyester A' (100 parts, solid content) was added to a mixed solvent of cyclohexanone (75 parts) and Solvesso 150 (75 parts, aromatic hydrocarbon) under stirring at 80° C., and dissolved over about 3 hours. Titanium oxide (40 parts), strontium chromate (40 parts), methyl etherified methylolmelamine (10 parts, Trademark SUMIMAL M-40S, involatile content 80%, manufactured by Sumitomo Chemical Company, Limited) and a 10% benzyl alcohol solution (2.5 parts) of p-toluenesulfonic acid was added per 100 parts of the solid content in the obtained solution. The mixture was dispersed for 5 hours in a glass beads type high speed shaker to give a coating composition.

The coating composition was applied to a 0.5 mm thick zinc phosphate-treated zinc-plated steel plate in a coating film thickness of 8 μm, and the plate was baked at 210° C. for 50 seconds. The top coating (a) obtained in Preparative Example was applied to the obtained coated plate in a thickness of about 18 μm, and the plate was baked at 230° C. for 60 seconds. The obtained coating film had good processability and hardness, and showed coating film properties superior in boiling water resistance, corrosion resistance and acid resistance, as well as excellent scratch property. The test results are shown in Table 11.

The coating compositions of Examples 8–14 and Comparative Examples 8–15 were prepared in the same manner as in Example 7, following the compositions shown in Tables 11 to 14, and subjected to coating and baking. The test results of the obtained coated steel plates are shown in Tables 11 to 14. The composition ratios of the coatings have been converted to solid contents.

The coating compositions were prepared in the same manner as in Example 1 using polyesters A'–F' and evaluated. As a result, the stain resistance of the coating film formed using the coating compositions comprising polyesters A'–F' was fine, as evidenced by the gasket resistance of 5 for every film.

TABLE 7

| composition (% by mole) 1) | | polyester A' | B' | C' |
|---|---|---|---|---|
| acid component | terephthalic acid | 50 | 49 | 50 |
| | isophthalic acid | 50 | 49 | |
| | orthophthalic acid | | | 34 |
| | sebacic acid | | | 15 |
| | trimellitic acid | | | 1 |
| | trimellitic acid (added later) | | 2 | |
| diol component | ethylene glycol | 5 | 5 | 5 |
| | 1,4-cyclohexanedimethanol | 45 | 45 | 45 |
| | DA350 2) | 50 | 50 | 50 |
| reduced viscosity (dl/g) | | 0.35 | 0.45 | 0.31 |
| glass transition temperature (°C.) | | 69 | 69 | 35 |
| acid value (equivalent/10⁶ g) | | 12 | 121 | 13 |

Note:
1) The composition was identified by NMR analysis.
2) Addition product of bisphenol A with ethylene oxide (2.3 moles) (manufactured by NOF Corporation)

TABLE 8

| composition (% by mole) 1) | | polyester resin D' | E' | F |
|---|---|---|---|---|
| acid component | terephthalic acid | 54 | | 50 |
| | isophthalic acid | | 73 | 49 |
| | orthophthalic acid | | 26 | |
| | sebacic acid | | | |
| | 1,4-cyclohexanedicarboxylic acid | 45 | | |
| | trimellitic acid | 1 | | |
| | trimellitic acid (added later) | | 1 | 1 |
| diol component | ethylene glycol | 5 | | 15 |
| | 1,4-cyclohexanedimethanol | 45 | 78 | 30 |
| | 3-methyl-1,5-pentanediol | | 5 | |
| | DA350 2) | 50 | 17 | 55 |
| reduced viscosity (dl/g) | | 0.38 | 0.46 | 0.42 |
| glass transition temperature (°C.) | | 67 | 57 | 61 |
| acid value (equivalent/10⁶ g) | | 16 | 80 | 76 |

Note:
1) The composition was identified by NMR analysis.
2) Addition product of bisphenol A with ethylene oxide (2.3 moles) (manufactured by NOF Corporation)

TABLE 9

| composition (% by mole) 1) | | polyester for comparison G' | H' | I' | J' |
|---|---|---|---|---|---|
| acid component | terephthalic acid | 50 | 50 | 50 | 40 |
| | isophthalic acid | 49 | 50 | 50 | |
| | orthophthalic acid | | | | |
| | sebacic acid | | | | 20 |
| | 1,4-cyclohexanedicarboxylic acid | | | | 40 |
| | trimellitic acid | 1 | | | |
| | trimellitic acid (added later) | | | | |
| diol component | ethylene glycol | | 45 | 50 | 6 |
| | neopentyl glycol | | | 50 | |
| | 1,4-cyclohexanedimethanol | | | | 34 |
| | DA350 2) | 65 | 55 | | 60 |
| | diethylene glycol | 35 | | | |
| reduced viscosity (dl/g) | | 0.47 | 0.43 | 0.56 | 0.48 |
| glass transition temperature (°C.) | | 58 | 67 | 65 | 19 |
| acid value (equivalent/10⁶ g) | | 9 | 13 | 12 | 5 |

Note:
1) The composition was identified by NMR analysis.
2) Addition product of bisphenol A with ethylene oxide (2.3 moles) (manufactured by NOF Corporation)

TABLE 10

| composition (% by mole) 1) | | polyester for comparison K' | M' |
|---|---|---|---|
| acid component | terephthalic acid | 50 | 50 |
| | isophthalic acid | | 49 |
| | orthophthalic acid | 50 | |
| | sebacic acid | | |
| | 1,4-cyclohexanedicarboxylic acid | | |
| | trimellitic acid | | 1 |
| | trimellitic acid (added later) | | |
| diol component | ethylene glycol | 8 | 10 |
| | 1,4-cyclohexanedimethanol | 32 | 70 |
| | DA350 2) | 60 | |
| | BPE140 3) | | 20 |
| reduced viscosity (dl/g) | | 0.14 | 0.35 |
| glass transition temperature (°C.) | | 62 | 12 |
| acid value (equivalent/10⁶ g) | | 5 | 11 |

Note:
1) The composition was identified by NMR analysis.
2) Addition product of bisphenol A with ethylene oxide (2.3 moles) (manufactured by NOF Corporation)
3) Addition product of bisphenol A with ethylene oxide (14.0 moles) (manufactured by Sanyo Chemical Industries, Ltd.)

TABLE 11

| | Example | | | | |
|---|---|---|---|---|---|
| | 7 | 8 | 9 | 10 | 11 |
| Ingredients | | | | | |
| polyester | A' | B' | B' | C' | C' |
| | 100 | 100 | 100 | 100 | 100 |
| aminoformaldehyde 1) | 10 | 10 | | 10 | |
| blocked isocyanate 2) | | | 15 | | |
| epoxy resin 3) | | | | | 15 |
| imidazole 4) | | | | | 4 |
| p-toluenesulfonic acid | 0.25 | 0.25 | | 0.25 | |
| dibutyl tin dilaurate | | | 0.5 | | |
| titanium dioxide | 40 | 40 | 40 | 40 | 40 |
| strontium chromate | 40 | | | | |
| zinc chromate | | 40 | 40 | 40 | 40 |
| Coating film properties | | | | | |
| acid resistance | ○ | ○ | ○ | ○ | ○ |
| boiling water resistance | ○ | ○ | ○ | ○ | ○ |
| processability (T) | 1 | 0 | 0 | 0 | 1 |
| hardness | H | H | F | HB | F |
| corrosion resistance | <1 | <1 | <1 | 2.0 | 1.5 |
| scratch property | ○ | ⊙ | ⊙ | ○ | ○ |

Note:
1) SUMIMAL M-40S (manufactured by Sumitomo Chemical Company, Limited)
2) IPDI B1530 (manufactured by Daicel-Hüls Ltd.)
3) EPICOAT1007 (manufactured by Yuka Shell Epoxy Kabushiki Kaisha)
4) 2MZ (manufactured by Shikoku Chemicals Corporation)

TABLE 12

| | Example | | |
|---|---|---|---|
| | 12 | 13 | 14 |
| Ingredients | | | |
| polyester | D' | E' | F' |
| | 100 | 100 | 100 |
| aminoformaldehyde 1) | 10 | 10 | 10 |
| P-toluenesulfonic acid | 0.25 | 0.25 | 0.25 |
| titanium dioxide | 40 | 40 | 40 |
| zinc chromate | 40 | 40 | 40 |

TABLE 12-continued

| | Example | | |
|---|---|---|---|
| | 12 | 13 | 14 |
| Coating film properties | | | |
| acid resistance | o | o | o |
| boiling water resistance | o | o | o |
| processability (T) | 2 | 1 | 0 |
| hardness | H | H | F |
| corrosion resistance | <1 | <1 | 2.0 |
| scratch property | o | o | o |

1) SUMIMAL M-40S (manufactured by Sumitomo Chemical Company, Limited)

TABLE 13

| | Comparative Example | | | | | |
|---|---|---|---|---|---|---|
| | 8 | 9 | 10 | 11 | 12 | 13 |
| Ingredients | | | | | | |
| polyester resin | G' | H' | I' | J' | K' | M' |
| | 100 | 100 | 100 | 100 | 100 | 100 |
| aminoformaldehyde 1) | 10 | 10 | 10 | 10 | 10 | 10 |
| p-toluenesulfonic acid | 0.25 | 0.25 | 0.25 | 0.25 | 0.25 | 0.25 |
| titanium dioxide | 40 | 40 | 40 | 40 | 40 | 40 |
| zinc chromate | 40 | 40 | 40 | 40 | 40 | 40 |
| Coating film properties | | | | | | |
| acid resistance | o | X | o | o | o | o |
| boiling water resistance | o | o | o | X | o | X |
| processability (T) | 0 | 1 | 4 | 0 | 5 | 0 |
| hardness | H | H | H | HB | F | B |
| corrosion resistance | 1.5 | 1.5 | 6.0 | 5.0 | 2.0 | 5.5 |
| scratch property | X | X | X | X | X | X |

Note:
1) SUMIMAL M-40S (manufactured by Sumitomo Chemical Company, Limited)

TABLE 14

| | Comparative Example | |
|---|---|---|
| | 14 | 15 |
| Ingredients | | |
| polyester resin | A' | A' |
| | 100 | 50 |
| aminoformaldehyde 1) | 1 | 60 |
| p-toluenesulfonic acid | 0.25 | 0.25 |
| titanium dioxide | 40 | 40 |
| zinc chromate | 40 | 40 |
| Coating film properties | | |
| acid resistance | o | X |
| boiling water resistance | o | o |
| processability (T) | 0 | 5 |
| hardness | F | H |
| corrosion resistance | 4.3 | 1.5 |
| scratch property | X | o |

1) SUMIMAL M-40S (manufactured by Sumitomo Chemical Company, Limited)

The coating films formed using the coating compositions of the third invention of the present invention had fine processability and hardness, and showed superior coating film properties such as boiling water resistance, corrosion resistance and acid resistance. In addition, the coating films had excellent scratch property which has not been achieved by the prior art. Accordingly, the present invention meets the high quality requirements of home appliances including those for outdoor uses, building materials such as roofing materials and wall materials, outdoor containers such as storerooms and radiator units, VTR and refrigerator.

What is claimed is:

1. A coating resin composition comprising a polyester (A) comprising an acid component comprising an aromatic dicarboxylic acid in a proportion of 50–100% by mole relative to the entire acid component and other carboxylic acid(s) in a proportion of 50–0% by mole relative to the entire acid component, and a glycol component comprising at least one member selected from the group consisting of 2-methyl-1,3-propanediol and 1,3-propanediol in a proportion of 1–25% by mole relative to the entire glycol component and an alkylene glycol having 5 to 10 carbon atoms in a proportion of 75–99% by mole relative to the entire glycol component, or an alicyclic glycol in a proportion of 20–85% by mole relative to the entire glycol component, an addition product of bisphenol A with alkylene oxide of the following formula (I)

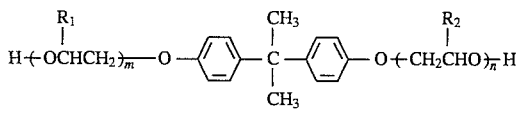

wherein $R_1$ and $R_2$ are the same or different and each is a hydrogen or a methyl, and m and n are, respectively, a number not less than 1 and satisfy $2 \leq m+n < 14$, in a proportion of 80–15% by mole relative to the entire glycol component and other glycol(s) in a proportion of 0–50% by mole relative to the entire glycol component, wherein the total of the glycols is 100% by mole, the polyester (A) having a reduced viscosity of not less than 0.2 dl/g: and a curing agent (B) reactive with the polyester (A), in a proportion of (A)/(B)=99/1—50/50 (weight ratio).

2. The resin composition of claim 1, wherein the polyester (A) comprises an acid component comprising an aromatic dicarboxylic acid in a proportion of 70–100% by mole relative to the entire acid component and other carboxylic acid(s) in a proportion of 30–0% by mole relative to the entire acid component, the terephthalic acid being in a proportion of 30–80% by mole relative to the entire acid component, and a glycol component comprising at least one member selected from the group consisting of 2-methyl-1, 3-propanediol and 1,3-propanediol in a proportion of 1–25% by mole relative to the entire glycol component and an alkylene glycol having 5 to 10 carbon atoms in a proportion of 99–75% by mole relative to the entire glycol component, the polyester (A) having a glass transition temperature of not more than 45° C. and the proportion of the polyester (A) and the curing agent (B) being (A)/(B)=95/5—60/40 (weight ratio).

3. The resin composition of claim 2, wherein the polyester (A) has a specific gravity of 1.21–1.30.

4. The resin composition of claim 3, wherein the polyester (A) has an acid value of 20–300 equivalents/$10^6$ g.

5. The resin composition of claim 4, wherein the polyester (A) has, upon addition of an acid anhydride after polymerization, an acid value of 20–300 equivalents/$10^6$ g.

6. The resin composition of claim 1, wherein the polyester (A) comprises a glycol component comprising an alicyclic glycol in a proportion of 20–85% by mole relative to the entire glycol component and an addition product of bisphenol A with alkylene oxide of the following formula (I)

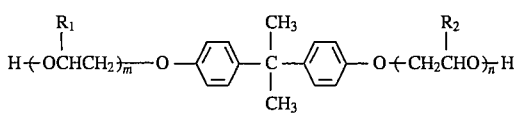

wherein $R_1$, and $R_2$ are the same or different and each is a hydrogen or a methyl, and m and n are respectively a number not less than 1 and satisfy $2 \leq m+n < 14$, in a proportion of 80–15% by mole relative to the entire glycol component.

7. The resin composition of claim 6, wherein the other glycol is an alkylene glycol having 2 to 10 carbon atoms, which is comprised in a proportion of 0–40% by mole relative to the entire glycol component.

8. The resin composition of claim 6, wherein the polyester (A) has an acid value of 50–500 equivalents/$10^6$ g.

9. The resin composition of claim 8, wherein the polyester (A) has, upon addition of acid anhydride after polymerization, an acid value of 50–500 equivalents/$10^6$ g.

10. The resin composition of claim 8, wherein the polyester (A) comprises the aromatic dicarboxylic acid in a proportion of 70–100% by mole relative to the entire acid component and other carboxylic acid(s) in a proportion of 30–0% by mole relative to the entire acid component.

11. The resin composition of claim 8, wherein the other carboxylic acid is an alicyclic dicarboxylic acid.

12. The resin composition of claim 8, wherein the polyester (A) comprises a glycol component comprising an alicyclic glycol in a proportion of 30–80% by mole relative to the entire glycol component, an addition product of bisphenol A with alkylene oxide in a proportion of 70–20% by mole and an alkylene glycol having 2 to 10 carbon atoms in a proportion of 0–30% by mole.

13. The resin composition of claim 6, wherein the proportion of the polyester (A) and a curing agent (B) is (A)/(B)=95/5—60/40 (weight ratio).

* * * * *